United States Patent [19]

Theurer

[11] 4,086,692
[45] May 2, 1978

[54] APPARATUS FOR REMOVING A TAMPING TOOL FROM ITS HOLDER

[75] Inventor: Josef Theurer, Vienna, Austria

[73] Assignee: Franz Plasser Bahnbaumaschinen-Industriegesellschaft G.m.b.H., Vienna, Austria

[21] Appl. No.: 749,884

[22] Filed: Dec. 13, 1976

[30] Foreign Application Priority Data

Feb. 4, 1976 Austria .................................. 791/76

[51] Int. Cl.² ............................................. B23P 19/04
[52] U.S. Cl. ..................................................... 29/252
[58] Field of Search .................................. 29/252, 239

[56] References Cited

U.S. PATENT DOCUMENTS

| 3,081,066 | 3/1963 | Murawski | 29/239 |
| 3,313,019 | 4/1967 | Fuselier | 29/252 |
| 3,857,158 | 12/1974 | Costello | 29/252 |

*Primary Examiner*—James L. Jones, Jr.
*Attorney, Agent, or Firm*—Kurt Kelman

[57] ABSTRACT

An apparatus for removing a tamping tool from a tool holder comprises a mechanism for moving the tamping tool out of the tamping tool holder bore wherein it is frictionally held, the mechanism including a frame attachable to the tamping head, a pair of jacks mounted on the frame and the frame arranged to hold the tamping tool shaft substantially centered therebetween, and a power source for operating the jacks.

9 Claims, 4 Drawing Figures

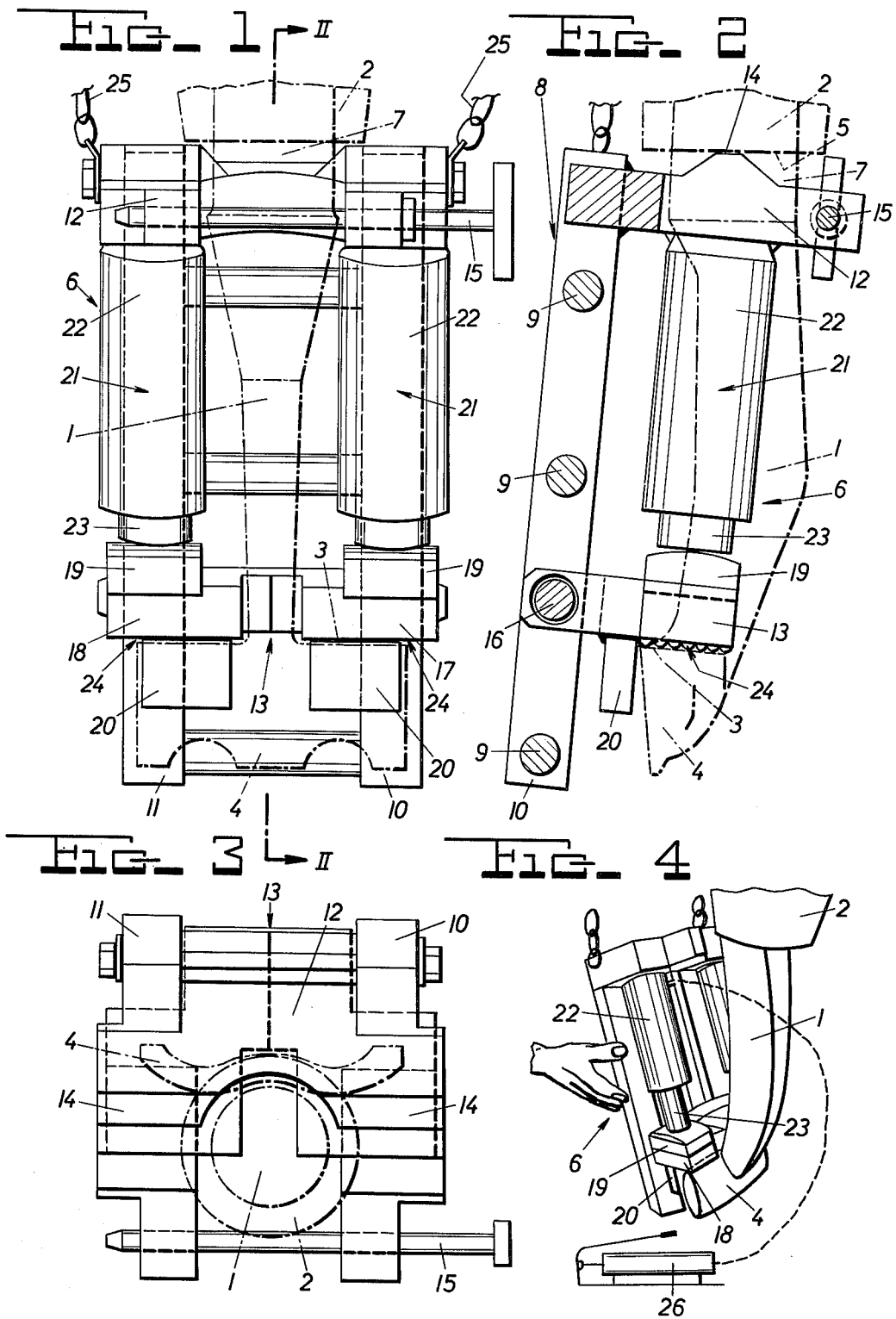

APPARATUS FOR REMOVING A TAMPING TOOL FROM ITS HOLDER

The present invention relates to an apparatus for removing a ballast tamping tool from a tool holder.

Tamping tools having a shaft and a transversely extending tamping jaw or plate at one end of the shaft for tamping ballast under the ties of a railroad track are well known. In track tampers, arrays of such tamping tools are assembled in tamping heads which have a tool holder for each tamping tool. Conventionally, each tool holder has an outwardly flaring conical bore and the other end of the tamping tool shaft has mating conical portion flaring outwardly towards the tamping tool jaw, the conical bore frictionally receiving the mating conical portion at the other shaft end of the tamping tool. The conical portion has a threaded end which projects above the tool holder when the conical portion is inserted into the bore to mount the tamping tool in the holder and, to fix the tamping tool in the holder, a nut is tightened on the threaded end into engagement with the upper side of the holder to hold the tamping tool in position. During tamping operations, considerable forces are transmitted to the tamping tools and from the tools to their holders along the engaging faces of the conical shaft portion and mating bore, causing interlocking of the engaging faces and making it very difficult to remove the tools from the holders after the nuts have been removed from the threaded ends. Thus, when it becomes necessary to replace the tamping tools on the tamping head, impact tools have been used to knock the conical shaft portion out of the mating bore. This has been a very time-consuming operation requiring considerable strength of the operator because there is very little room on tamping heads for executing this work, it is, therefore, difficult to obtain the required leverage for the strong forces required to disengage the tamping tool from its holder, and, additionally, the operation of the impact tool frequently damages adjacent parts of the tamping head.

It is the primary object of this invention to provide a simple and relatively inexpensive apparatus for removing such tamping tools from their holders, in which they are frictionally held, in a manner assuring rapid disengagement without damage to the tamping head.

The above and other objects are accomplished in accordance with the invention with a mechanism for moving the tamping tool out of the tool holder bore. The mechanism includes a frame, means for attachment of the frame to the tamping head, a pair of jacks mounted on the frame and the frame arranged to hold the tamping tool shaft substantially centered therebetween, and a power source for operating the jacks.

The jacks operate in the general direction of the tamping tool shaft to force the other shaft end out of the tool holder bore wherein it is frictionally received in a continuous stroke, thus assuring rapid removal of the tamping tool from its holder without the use of any impact tools which could damage parts of the machine. Such a tamping tool removal apparatus increases the efficiency of the tamper because, as soon as any tamping tool need replacement during a continuous tamping operation on the track, this can be done promptly and effectively whereby dead times are reduced to a minimum. Since the mechanism only engages the underside of the tool holder and the upper side of the tamping tool jaw, damage to the upper portion of the tamping tool, i.e. the conical portion and threaded end, and to the tool holder is minimized. Operation of the pair of jacks between which the tamping tool shaft is centered imparts a continuous uniform pulling force on the tamping tool, which rapidly overcomes even very strong frictional engagement between the conical portion of the tamping tool jaw and the conical bore of the tool holder.

The above and other objects, advantages and features of the present invention will become better understood from the following detailed description of a now preferred embodiment thereof, taken in conjunction with the accompanying drawing wherein p FIG. 1 is an end view of an apparatus positioned to remove a tamping tool, shown in chain-dotted lines, from its holder;

FIG. 2 is a sectional view along line II—II of FIG. 1;

FIG. 3 is a top view of FIG. 1; and

FIG. 4 is a perspective view showing the apparatus somewhat schematically while being mounted on a tamping head for removing a tamping tool.

Referring now to the drawing, FIGS. 1 to 3 show, in chain-dotted lines, tamping tool 1 having a shaft and a transversely extending tamping jaw or plate 4 at one end of the shaft, and tool holder 2 having a bore frictionally receiving the other shaft end. The tool holder forms part of a tamping head (not shown) and the tamping tool jaw has an upper side 3 facing an under side 5 of tool holder 2. The apparatus for removing the tamping tool from the tool holder comprises mechanism 6 for moving the tamping tool connecting part 7 out of the tool holder bore, the mechanism being positioned between upper side 3 of the tamping tool jaw and under side 5 of the tool holder.

The illustrated mechanism 6 comprises an elongated frame part arranged to extend in the direction of the tamping tool shaft and consisting of two elongated strut members 10 and 11 interconnected by transverse brace members 9, and two cross members 12 and 13 arranged to abut, respectively, upper side 3 of tamping tool jaw 4 and under side 5 of tool holder 2. The cross members are substantially U-shaped yokes whose legs are aligned with a pair of jacks 21 arranged between the cross members, with the tamping tool shaft substantially centered between the jacks. As shown in the illustrated embodiment, upper cross member 12 is fixedly mounted on elongated strut members 10 and 11, embracing with its legs connecting part 7 of tamping tool 1. The two cross member legs preferably have convex abutment portions 14 for engagement with the under side of tool holder 2. The projecting ends of the cross member legs have bores for receiving safety bolt 15 for interconnecting the outer leg ends and thus to hold tamping tool connecting part 7 securely between the cross member legs during the removing operation. Lower cross member 13 is pivotally mounted on longitudinal strut members 10 and 11 for pivoting about axle 16 journaled in the strut members. Preferably, legs 17 and 18 of cross member 13 are independently pivotal about axle 16 in substantially parallel vertical planes generally parallel to the shaft of the tamping tool centered between legs 17 and 18. The outer ends of pivotal legs 17 and 18 carry abutments 19 the upper faces of which are convex for engagement with piston rod 23 projecting from cylinder 22 of pressure fluid operated jack 21 while the lower faces 24 thereof are roughened for engagement with upper side 3 of the tamping tool jaw. Stops 20 project downwardly from legs 17 and 18 for engagement with tamping jaw 4. In this manner, the tamping tool jaw is engaged by lower cross member 13 when it is downwardly pivoted upon downward movement of piston rod 23, this downward movement continuously pulling on the tamping tool to move its connecting part 7 out of holder 2. Cylinders 22 of the jack have their upper ends affixed to the legs of cross member 12.

The symmetrical arrangement of the cross members in relation to the tamping tool assures that a uniform pulling force is exerted upon the tamping tool during the removal operation, thus avoiding pull towards one side or the other. Furthermore, mounting the apparatus for operation is particularly simple since it merely requires centering of the tamping tool between the cross member legs, which may be done almost instantaneously. Pivoting of the lower cross member legs facilitates positioning even where little room for access to the tamping tools and their jaws is available.

By fixing the upper ends of the jack cylinders to the upper cross member and engaging the jack piston rods with the convex faces of the lower cross member, it is possible to make the mechanism relatively narrow so that it may be mounted on closely spaced tamping tools. Furthermore, affixing the relatively large surface of the cylinders to a cross member, rather than the piston rods, makes for a more solid structure.

The roughened abutment face 24 enables the pivotal legs of lower cross member 13 to be in secure engagement with the tamping tool jaw even when the same has been unevenly worn during prolonged tamping operations, thus assuring even and uniform force transmittal from the jacks to the tamping tool which is centered between the cross member legs. Abutments 19 and stops 20 hold the tamping tool securely in position during the removal operation and furthermore enable the tamping tool to be readily positioned for the operation.

As shown in FIGS. 1 and 2, attachment chain 25 is connected to the upper ends of longitudinal strut members 10 and 11 for suspending frame 8 of mechanism 6 on the tamping head to hold the apparatus in position during operation of jacks 21 for removing tamping tool 1 from the tamping head. When the mechanism is thus suspended on the tamping head and connecting part 7 of the tamping tool has been secured in position by safety bolt 15, centered positioning of the tamping tool jaw with respect to abutments 19 and stops 20 is greatly facilitated, and the tamping tool is securely held in the frame during removal.

FIG. 4 shows manually operable pump 26 connected to jacks 21 for operation of the jacks. The pump may either have separate connections to the jack cylinders or, preferably, a common connection enables the pump to deliver pressure fluid to both cylinders simultaneously. Such a power source for the jack operation is cheap and readily available. Furthermore, such a power source is independent of the operation of the track tamper so that the mechanism of this invention may be used also with electrically driven machines, for example. A single pump may also be used for a plurality of tamping tool removal mechanisms.

Mounting of the apparatus and its operation will be apparent from the above description of its structure and will be further elucidated hereinbelow.

When a tamping tool is to be removed for repair or replacement, mechanism 6 is suspended by chain 25 on the tamping head in a position wherein lower cross member 13 of the mechanism is adjacent tamping jaw 4. Roughened surface 24 is placed on upper side 3 of the tamping jaw, with stop 20 in engagement therewith. The upper portion of frame 8 is then swung into position to center connecting part 7 of the tamping tool between the legs of upper cross member 12 and safety bolt 15 is inserted so that the tamping tool connecting part is securely held. The mechanism is now in position for operation of jacks 21 by pump 26. Delivery of pressure fluid to jack cylinders 21 will move abutment ribs 14 of the upper cross member into engagement with the under side 5 of holder 2 while piston rods 23 will press against abutments 19 of the lower cross member to pull the tamping tool in a continuous stroke out of the holder. When the frictional force clamping connecting part 7 of the tamping tool in the holder bore has been overcome by the force of jacks 21, tamping tool 1 will fall down while mechanism 6 remains suspended on the tamping head by chain 25. If the chain is long enough, it may be so mounted on the tamping head that the mechanism may be moved for the removal of adjacent tamping tools without remounting of the mechanism.

Also, the frame of the mechanism is such that it may be brought into operative position in relation to a tamping tool not only from the front, i.e. the side of the tamping tool where the tamping tool jaw is affixed, as in the illustrated embodiment, but also from the rear. This selective positioning makes the mechanism useful in tamping heads where pairs of tamping tools are mounted so closely adjacent that their jaws may be immersed in the same crib.

While pressure fluid operated jacks have been illustrated as a preferred embodiment, other types of jacks could also be used, such as spindle-operated jacks, ratchet-operated jacks or eccentric levers and equivalent mechanisms. The power may be provided by hydraulic fluid, compressed air or electric drives. The illustrated hand pump is preferred.

I claim:

1. An apparatus for removing a tamping tool from a tool holder, the tamping tool having a shaft and a transversely extending tamping jaw at one end of the shaft, and the tool holder having a bore frictionally receiving the other shaft end, the tool holder forming part of a tamping head and the tamping tool jaw having an upper side facing an under side of the tool holder, the apparatus comprising a mechanism for moving the tamping tool out of the tool holder bore, the mechanism including a frame comprising two cross members arranged to abut, respectively, the upper side of the tamping tool jaw and the under side of the tool holder, means for attachment of the frame to the tamping head, a pair of jacks mounted on the frame and arranged between the cross members to hold the tamping tool shaft substantially centered therebetween, and a power source for operating the jacks.

2. The apparatus of claim 1, wherein the jacks are cylinder-and-piston devices operated by pressure fluid and the power source is a source of pressure fluid connected to the cylinders of the devices.

3. The apparatus of claim 1, wherein the frame of the mechanism comprises an elongated frame part arranged to extend in the direction of the tamping tool shaft, the cross members are mounted on the elongated frame part, and at least one of the cross members are pivotal in a plane extending in the direction of the shaft.

4. The apparatus of claim 3, wherein the cross member arranged to abut the upper side of the tamping tool jaw is pivotal.

5. The apparatus of claim 3, further comprising an attachment chain for suspending the frame on the tamping head, the cross member arranged to abut the under side of the tool holder has two legs extending from the elongated frame part for centering the tamping tool shaft therebetween, and further comprising a safety bolt for interconnecting the outer ends of the legs.

6. The apparatus of claim 3, wherein the jacks are cylinder-and-piston devices operated by pressure fluid and the cylinders have upper ends affixed to the cross member arranged to abut the under side of the tool holder.

7. The apparatus of claim 6, wherein the cross member arranged to abut the upper side of the tamping tool jaw is pivotal on the elongated frame part and has abutment faces for engagement with the upper side of the tamping tool jaw on both sides of the shaft, the abutment faces being roughened for increased frictional contact with the upper side of the tamping tool jaw.

8. The apparatus of claim 7, wherein the pivotal cross member further comprises a stop projecting from the member for engagement with the jaw.

9. The apparatus of claim 1, wherein the jacks are cylinder-and-piston devices operated by pressure fluid and the power source is a manually operable pump for delivering the pressure fluid to the cylinders for operating the devices.

* * * * *